(12) United States Patent
Wu

(10) Patent No.: US 9,706,760 B2
(45) Date of Patent: Jul. 18, 2017

(54) FISHING LURE LIGHT EMITTING DEVICE

(71) Applicant: TOP CASTLE HOLDINGS LTD., Miami, FL (US)

(72) Inventor: Chung Wen Wu, Keelung (TW)

(73) Assignee: Top Castle Holdings Ltd., Miami, FL (US)

( * ) Notice: Subject to any disclaimer, the term of this patent is extended or adjusted under 35 U.S.C. 154(b) by 0 days.

(21) Appl. No.: 14/954,515

(22) Filed: Nov. 30, 2015

(65) Prior Publication Data

US 2017/0150704 A1    Jun. 1, 2017

(51) Int. Cl.
*A01K 85/01*    (2006.01)
*F21V 8/00*    (2006.01)
*F21S 9/02*    (2006.01)

(52) U.S. Cl.
CPC ............. *A01K 85/01* (2013.01); *F21S 9/02* (2013.01); *G02B 6/0006* (2013.01); *G02B 6/0008* (2013.01)

(58) Field of Classification Search
CPC .... A01K 85/01; G02B 6/0006; G02B 6/0008; F21S 9/02
See application file for complete search history.

(56) References Cited

U.S. PATENT DOCUMENTS

| | | | |
|---|---|---|---|
| 3,862,509 A * | 1/1975 | Petersen, Jr. | A01K 87/002 43/17.5 |
| 6,807,766 B1 | 10/2004 | Hughes et al. | |
| 6,922,935 B2 | 8/2005 | Yu | |
| 7,107,717 B2 | 9/2006 | Pelegrin | |
| 7,263,797 B1 | 9/2007 | Trillo | |
| 8,091,270 B2 | 1/2012 | Senter et al. | |

* cited by examiner

*Primary Examiner* — Thomas M Sember
(74) *Attorney, Agent, or Firm* — Muncy, Geissler, Olds & Lowe, P.C.

(57) ABSTRACT

A fishing lure light emitting device includes a body, a light guiding bar, and a light emitting member. The body has a holder. The light guiding bar is embedded in the body. One end of the light guiding bar has a light receiving portion connected in the holder. The light emitting member includes a base and a light emitter. The base is detachably inserted into the holder. The light emitter is received in the holder and faces the light receiving portion of the light guiding bar. Since the base can be detached from the holder of the body, the light emitting member can be assembled to different bodies.

4 Claims, 4 Drawing Sheets

FISHING LURE LIGHT EMITTING DEVICE

BACKGROUND OF THE INVENTION

Field of the Invention

The present invention relates to a fishing tool, and more particularly to a fishing lure light emitting device.

Description of the Prior Art

U.S. Pat. Nos. 6,807,766B1, 6,922,935B2, 7,107,717B2, 7,263,797B1, and 8,0912,70B2 respectively discloses a light emitting fishing lure. Each of these fishing lures includes a circuit board, a battery, and a light emitting member. Accordingly, the fishing lures can be hooked by the fishing hooks and attract fishes to bite the hooks.

Commonly, the front of the fishing lure is hooked by the fishing hook, while the circuit board, the battery, the light emitting member, and other components are embedded in the rear of the fishing lure. When the fishing lure is bitten by fishes for several times, usually the rear of the fishing lure may be bitten and left the front of the fishing lure being hooked by the fishing hook. Accordingly, the fishing lure, the circuit board, the battery, and the light emitting member cannot be used anymore. In addition, water pollution issue may be raised once the electronic components like the circuit board, the battery, and the light emitting member fall in the water.

The present invention is, therefore, arisen to obviate or at least mitigate the above mentioned disadvantages.

SUMMARY OF THE INVENTION

One object of the present invention is to solve the aforementioned problems and provide a fishing lure light emitting device which prevents the waste of components and the water pollution issue caused by the existing light emitting fishing lures.

To achieve the above and other objects, the fishing lure light emitting device comprises a body, a light guiding bar, and a light emitting member. The body has a holder. The light guiding bar is embedded in the body, and one of two ends of the light guiding bar has a light receiving portion connected in the holder. The light emitting member comprises a base and a light emitter assembled to the base. The base is detachably inserted into the holder, and the light emitter is received in the holder and faces the light receiving portion of the light guiding bar.

Wherein, the body has a predetermined length. The light guiding bar is embedded in the body along the length direction of the body. The other end of the light guiding bar is exposed out of the body.

Wherein, the body is made of soft material, and the holder is made of rigid material. The holder has an inserting groove which has an exposed opening. The base of the light emitting member is inserted into the inserting groove in a direction where the light emitter is near to the inserting groove. The light receiving portion of the light guiding bar is exposed from the bottom of the inserting groove, and the light emitter faces the light receiving portion in the inserting groove.

Wherein, the base is made of soft material, so that the base is seamlessly assembled with the holder when the base is inserted into the inserting groove.

Wherein, the light emitting member comprises a battery received in the base, and the battery provides the power for lighting the light emitter.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 4, illustrating embodiments of a fishing lure light emitting device. The figures are provided for illustrative purposes and not limitations to the present invention.

Figure 1:
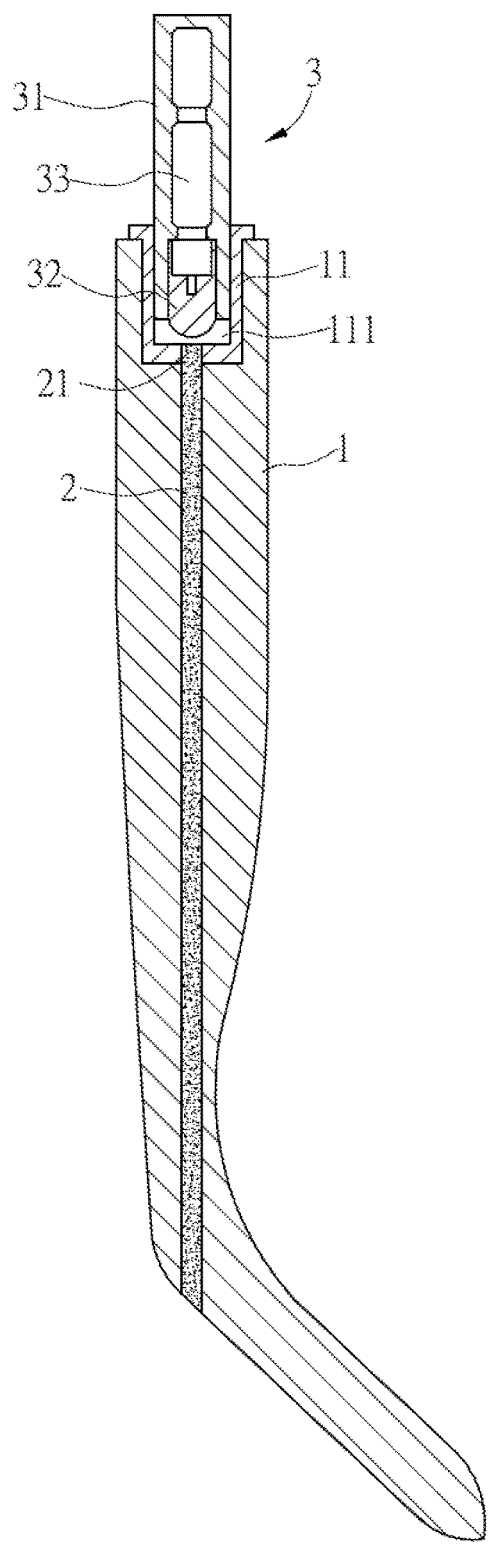
FIG. 1 illustrates a perspective sectional view of a fishing lure light emitting device according to the present invention.

In this embodiment, a fishing lure light emitting device is provided. As shown in FIG. 1, the device comprises a body 1, a light guiding bar 2, and a light emitting member 3.

Figure 2:
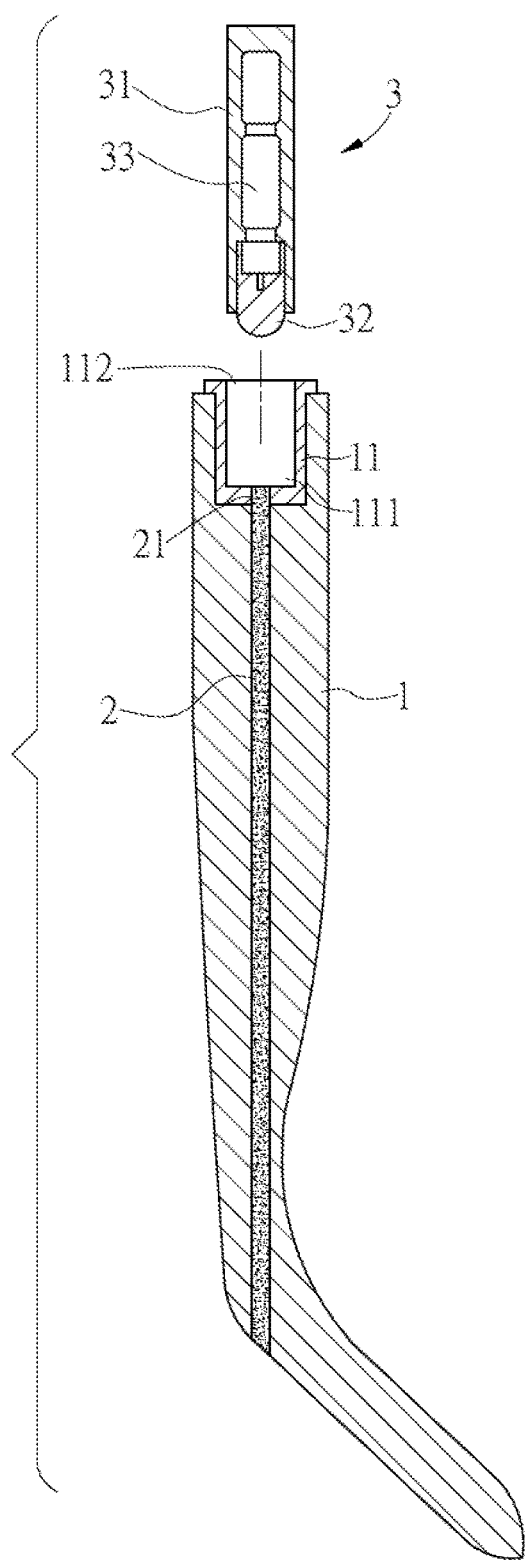
FIG. 2 illustrates an exploded sectional view of the fishing lure light emitting device according to the present invention.
Figure 3:
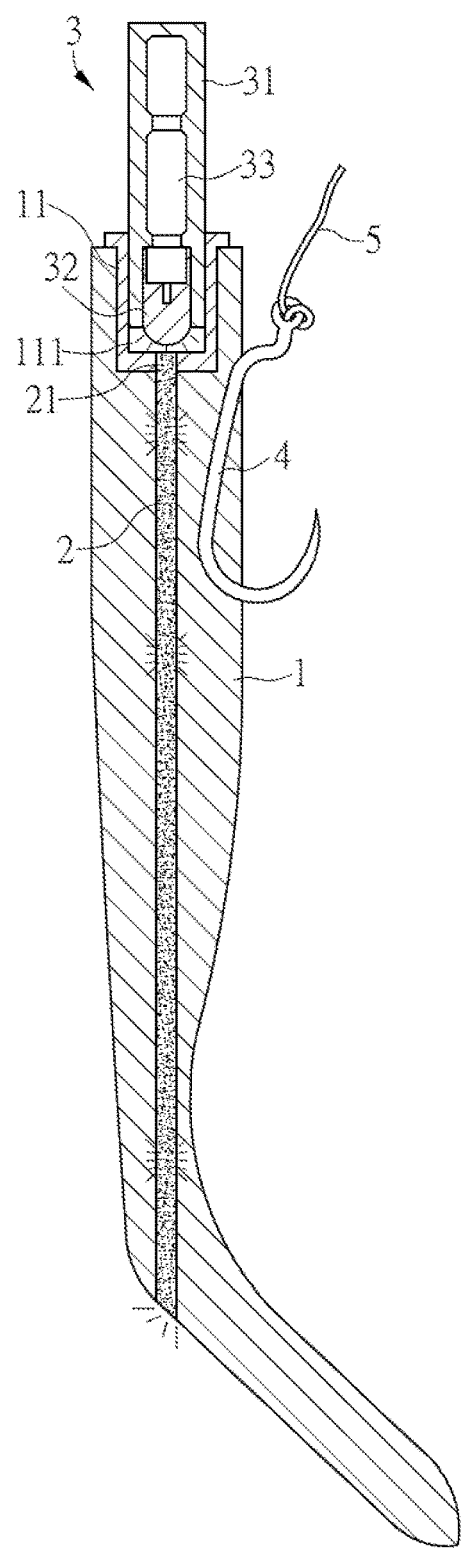
FIG. 3 illustrates an operational view of the fishing lure light emitting device according to the present invention.
Figure 4:
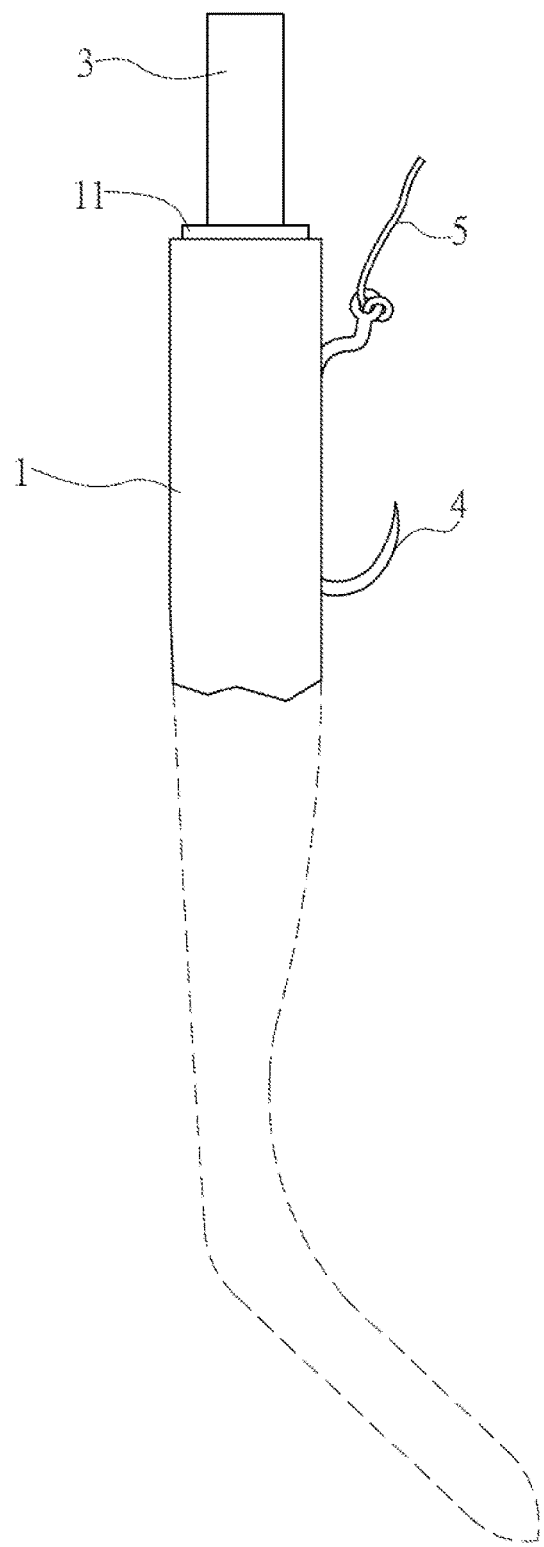
FIG. 4 illustrates a schematic view showing parts of the body of the fishing lure light emitting device are damaged.

As shown in FIGS. 1 to 2, the body 1 has a holder 11, the light guiding bar 2 is embedded in the body 1, and one of two ends of the light guiding bar 2 has a light receiving portion 21 connected in the holder 11. The light emitting member 3 comprises a base 31 and a light emitter 32. The light emitter 32 is assembled to the base 31. The base 31 of the light emitting member 3 is inserted into the holder 11, and the light emitter 32 is received in the holder 11 and faces the light receiving portion 21 of the light guiding bar 2. The base 31 is detachably inserted into the holder 11, so that the base 31 may be repeatedly inserted into or detached from the holder 11.

As shown in FIGS. 1 to 2, in this embodiment, the body 1 has a predetermined length, the light guiding bar 2 is embedded in the body 1 along the length direction of the body 1, and the other end of the light guiding bar 2 (the end distant from the light receiving portion 21) is exposed out of the body 1. Since the light receiving portion 21 of the light guiding bar 2 faces the light emitter 32, the light guiding bar 2 emits light in the body 1 by receiving the light from the light emitter 32, and a spot may be formed at the end of the light guiding bar 2 exposed out of the body 1. Accordingly, fishes may be attracted by the fishing lure.

As shown in FIGS. 1 to 2, in this embodiment, the body 1 is made of soft material, and the holder 11 is made of rigid material. The holder 11 has an inserting groove 111, and the inserting groove 111 defines an exposed opening 112. The base 31 of the light emitting member 3 is inserted into the inserting groove 111 in a direction where the light emitter 32 is near to the inserting groove 111, the light receiving portion 21 of the light guiding bar 2 is exposed from the bottom of the inserting groove 111, and the light emitter 32 faces the light receiving portion 21 in the inserting groove 111.

In this embodiment, the light emitting member 3 comprises a battery 33 received in the base 31, and the battery 33 provides the power for lighting the light emitter 32. In this embodiment, the base 31 is made of soft material, so that the base 31 is seamlessly assembled with the holder 11 when the base 31 is inserted into the inserting groove 111.

In practice, a fishing hook 4 is provided to hook the body 1, and the hooked portion of the body 1 is near to the holder 11. Hence, the body 1 can be dipped into a fishing pool along with the fishing hook 4 and a fishing wire 5 winded with the fishing hook 4 for fishing. In the water, the body 1 lights because of the lighting of the light guiding bar 2, and a spot is formed at the end of the light guiding bar 2 exposed out of the body 1, attracting fishes to bite the fishing lure. When the fishing lure is bitten by the fishes for several times, parts of the body 1 may be bitten (as illustrated by the dot lines shown in FIG. 4) and the body 1 cannot attract fishes anymore, so that the fisher has to replace by a new one. To replace the body 1, the fisher only has to pull up the fishing wire 5 from the water and detach the base 31 of the light emitting member 3 from the holder 11 of the damaged body 1; then, the base 31 is inserted into the holder 11 of a new body 1 to allow the subsequent use.

Based on the above, the present invention has following advantages. Since the base 31 of the light emitting member 3 is detachably inserted into the holder 11, when parts of the body 1 are damaged and the light emitting member 3 is not damaged, the base 31 of the light emitting member 3 can be detached from the damaged body 1 and then inserted into the holder 11 of a new body 1. Therefore, as long as the fisher prepares a certain amount of bodies 1, the fisher can use the same light emitting member 3 with different bodies 1 for fishing. Accordingly, when the body 1 is damaged, the fisher does not have to discard the light emitting member 3, and the components would not be wasted. In addition, the water pollution issue caused by the discarded light emitting components as disclosed in the existing fishing lure can be prevented.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A fishing lure light emitting device, comprising:
a body having a holder;
a light guiding bar embedded in the body, wherein one of two ends of the light guiding bar has a light receiving portion connected in the holder;
a light emitting member comprising a base and a light emitter assembled to the base, wherein the base is detachably inserted into the holder, and the light emitter is received in the holder and faces the light receiving portion of the light guiding bar;
wherein the body is made of soft material, the holder is made of rigid material, wherein the holder has an inserting groove which has an exposed opening, the base of the light emitting member is inserted into the inserting groove in a direction where the light emitter is near to the inserting groove, the light receiving portion of the light guiding bar is exposed from the bottom of the inserting groove, and the light emitter faces the light receiving portion in the inserting groove.

2. The fishing lure light emitting device according to claim 1, wherein the body has a predetermined length, the light guiding bar is embedded in the body along the length direction of the body, and the other end of the light guiding bar is exposed out of the body.

3. The fishing lure light emitting device according to claim 1, wherein the base is made of soft material, so that the base is seamlessly assembled with the holder when the base is inserted into the inserting groove.

4. The fishing lure light emitting device according to claim 1, wherein the light emitting member comprises a battery received in the base, the battery provides the power for lighting the light emitter.

* * * * *